United States Patent [19]

Sakai

[11] Patent Number: 4,704,097
[45] Date of Patent: Nov. 3, 1987

[54] CONTROL SYSTEM FOR A CONTINUOUSLY VARIABLE TRANSMISSION

[75] Inventor: Yasuhito Sakai, Higashimurayama, Japan

[73] Assignee: Fuji Jukogyo Kabushiki Kaisha, Tokyo, Japan

[21] Appl. No.: 933,735

[22] Filed: Nov. 21, 1986

[30] Foreign Application Priority Data

Nov. 28, 1985 [JP] Japan .................................. 60-267901

[51] Int. Cl.⁴ ............................................. F16H 11/04
[52] U.S. Cl. ..................................................... 474/28
[58] Field of Search ...................... 474/28, 18, 16, 69; 74/864, 867, 868

[56] References Cited

U.S. PATENT DOCUMENTS

| 4,152,947 | 5/1979 | van Deursen et al. | 474/28 X |
| 4,400,164 | 8/1983 | Cadee | 474/12 |
| 4,534,243 | 8/1985 | Yokoyama et al. | 474/28 |
| 4,543,077 | 9/1985 | Yamamuro et al. | 474/28 X |
| 4,601,681 | 7/1986 | Costelli et al. | 474/28 |
| 4,619,157 | 10/1986 | Sakai | 474/28 |
| 4,627,313 | 12/1986 | Sakai | 474/28 |
| 4,628,773 | 12/1986 | Itoh et al. | 474/28 X |

FOREIGN PATENT DOCUMENTS 58-94663  6/1983  Japan .

Primary Examiner—Stephen J. Novosad
Assistant Examiner—Thuy M. Bui
Attorney, Agent, or Firm—Martin A. Farber

[57] ABSTRACT

A control system for a continuously variable belt-drive transmission which has a drive pulley having a hydraulically shiftable disc and a servo chamber for shifting the disc, a driven pulley having a hydraulically shiftable disc and a servo chamber for shifting the disc, and a belt engaged with both the pulleys. A hydraulic control circuit is provided for supplying oil to the servo chambers and for draining the servo chambers. A supplementary oil circuit is provided in the hydraulic control circuit for supplying supplementary oil to the servo chamber of the drive pulley, thereby filling the servo chamber with the oil before the starting of transmission operation.

3 Claims, 5 Drawing Figures

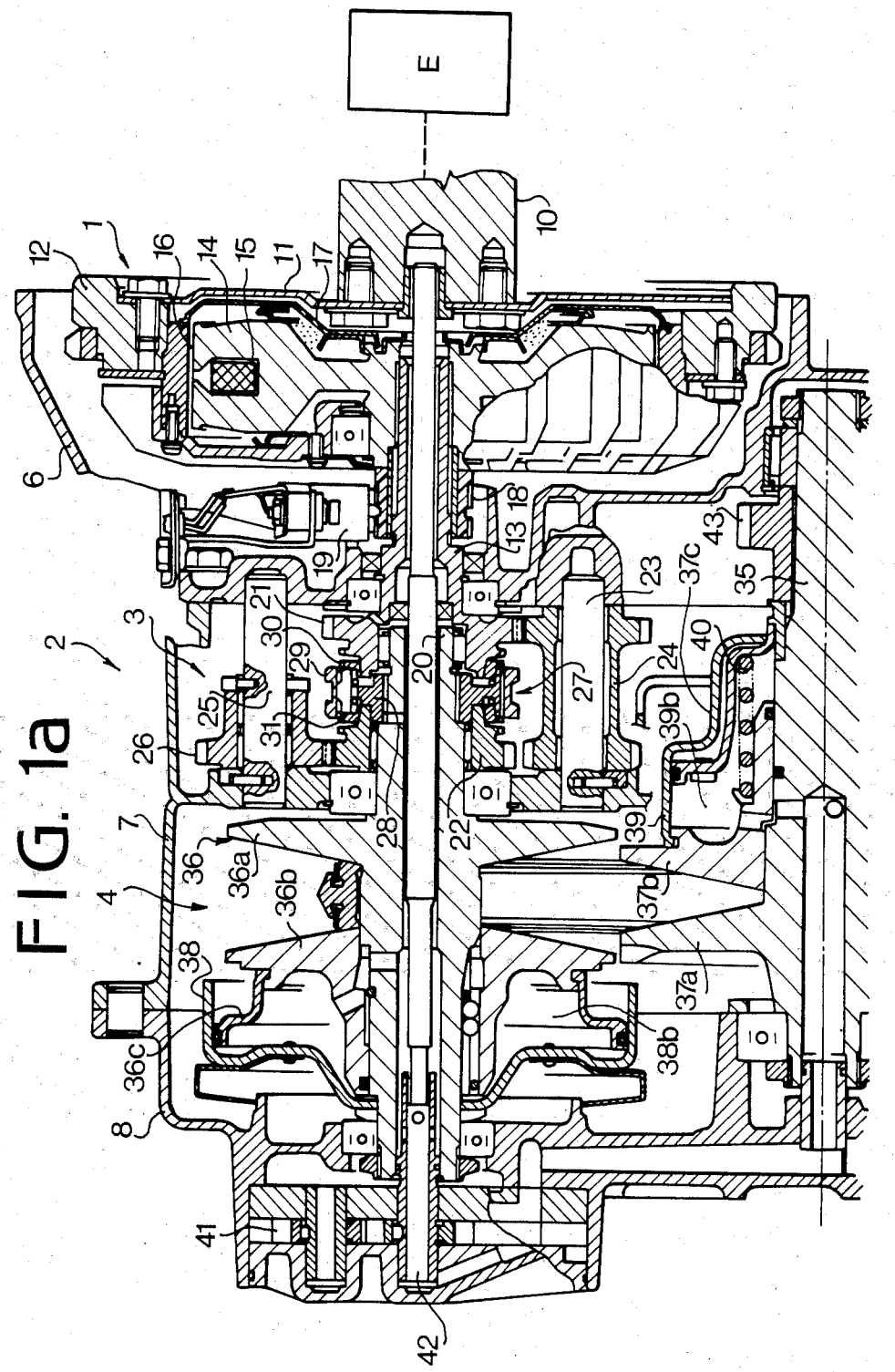

CONTROL SYSTEM FOR A CONTINUOUSLY VARIABLE TRANSMISSION

BACKGROUND OF THE INVENTION

The present invention relates to a control system of a continuously variable belt-drive automatic transmission for a motor vehicle, and particularly to a hydraulic control system for the continuously variable transmission.

U.S. Pat. No. 4,400,164 discloses a control system for a continuously variable belt-drive transmission. The transmission comprises an endless belt running over a drive pulley and a driven pulley, each pulley is so designed that the running diameter of the driving belt on the pulleys varies by a hydraulic control system.

In the hydraulic control system, a line pressure of oil is continuously applied to a servo chamber for the driven pulley and further the line pressure is applied to another servo chamber for the drive pulley by a transmission ratio control valve after starting the operation so as to control to upshift the transmission. In the conventional system, before starting the upshift operation, the servo chamber of the drive pulley is communicated with a drain port of the transmission ratio control valve to drain the servo chamber, so as to provide a maximum low speed stage at a maximum transmission ratio.

However, if the servo chamber of the drive pulley is kept draining before the starting of the transmission ratio changing operation, all or a part of the oil in the servo chamber is discharged, resulting in induction of air into the servo chamber. Accordingly, when the line pressure is applied to the servo chamber of the drive pulley through the transmission ratio control valve, the air in the servo chamber is compressed first, and then the pressure of oil elevates to start the upshifting of the transmission, causing in delays in elevation of the oil pressure and in response of transmission operation.

Japanese Patent Laid Open No. 58-94663 discloses a control system for a continuously variable transmission intended to eliminate above described disadvantages. In the control system, auxiliary circuit is connected to a passage for a servo chamber of a drive pulley so as to supply low pressure oil to the servo chamber before the starting of upshifting of the transmission. When a spool of a transmission ratio control valve is shifted, oil at a line pressure is supplied to the servo chamber to start upshifting. Since the line pressure is higher than the low pressure of oil in the auxiliary circuit, the line pressure oil passes through the auxiliary circuit in the counter direction. In order to prevent the counter flow of the oil, a check valve must be provided in the auxiliary circuit, which renders the construction of the system complicated.

SUMMARY OF THE INVENTION

Therefore, the object of the present invention is to provide a control system of a simplified composition which is capable of continuously supplying oil to a servo chamber of a drive pulley to keep the servo chamber filled with oil.

According to the present invention, there is provided a control system for a continuously variable belt-drive transmission having a drive pulley including a hydraulically shiftable disc and a servo chamber for shifting the disc, a driven pulley including a hydraulically shiftable disc and a servo chamber for shifting the disc, a belt engaged with both the pulleys, and a hydraulic control circuit for supplying oil to the servo chambers and for draining the servo chambers.

The hydraulic control circuit is provided with a pressure regulator valve for providing a line pressure and a transmission ratio control valve for applying the line pressure to the servo chamber of the drive pulley. A supplementary oil circuit is provided in the hydraulic control circuit for supplying supplementary oil to the servo chamber of the drive pulley, before the transmission ratio changing operation starts.

The other objects and features of this invention will be apparently understood from the following description with reference to the accompanying drawings.

BRIEF DESCRIPTION OF DRAWINGS

FIGS. 1a and 1b are sectional views of a continuously variable belt-drive transmission to which the present invention is applied;

DETAILED DESCRIPTION OF THE PREFERRED EMBODIMENT

Figure 1B:
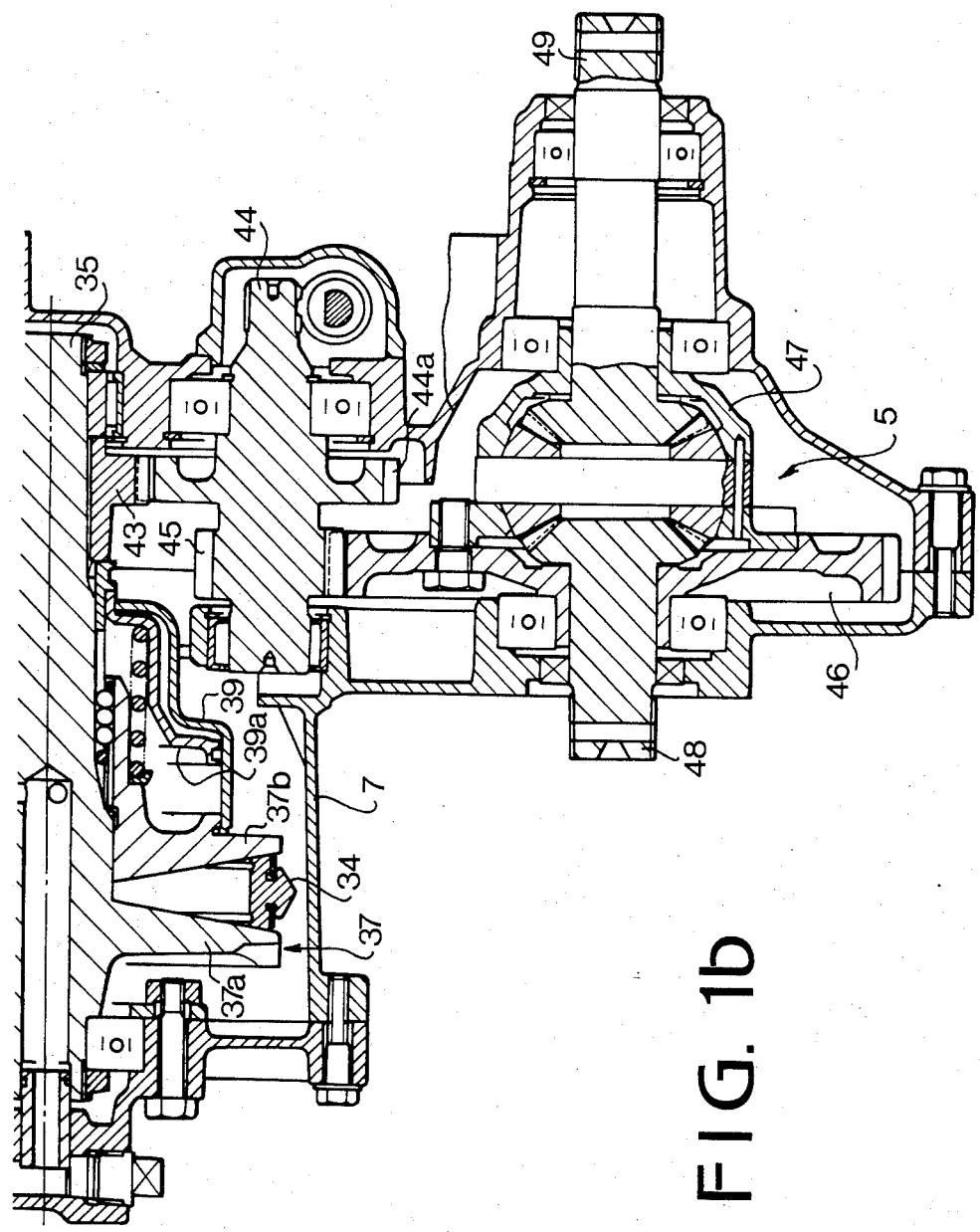

Referring to Figs. 1a and 1b, a continuously variable belt-drive automatic transmission for a vehicle, to which the present invention is applied, comprises an electromagnetic powder clutch 1, a continuously variable belt-drive transmission 2, a selector device 3, pulleys and belt device 4, final reduction device 5, and a hydraulic control circuit (FIGS. 2a and 2b) which will be described hereinafter. The electromagnetic powder clutch 1 is provided in a housing 6, and the selector device 3, pulleys and belt device 4 and final reduction device 5 are provided in a main housing 7 and a side housing 8. A crankshaft 10 of an engine E is connected to an annular drive member 12 through a drive plate 11 of the electromagnetic powder clutch 1. The electromagnetic powder clutch 1 comprises a driven member 14, a magnetizing coil 15 provided in the driven member 14. The driven member 14 has its outer periphery spaced from the inner periphery of the drive member 12 by a gap 16, and a powder chamber 17 is defined between the drive member 12 and driven member 14. Powder of magnetic material is provided in the powder chamber 17. The driven member 14 is secured to an input shaft 13 of the belt-drive transmission. A holder secured to the driven member 14 carries slip rings 18 which are electrically connected to the coil 15. The coil 15 is supplied through brushes 19 and slip rings 18 with current from a control circuit for the electromagnetic powder clutch.

When the magnetizing coil 15 is excited by the clutch current, driven member 14 is magnetized to produce a magnetic flux passing through the drive member 12. The magnetic powder is aggregated in the gap 16 by the magnetic flux and the driven member 14 is engaged with the drive member 12 by the powder. On the other hand, when the clutch current is cut off, the drive and driven members 12 and 14 are disengaged from one another.

In the belt-drive transmission 2, the selector device 3 is provided between the input shaft 13 and a main shaft 20. The main shaft 20 is cylindrical and is disposed coaxially with the input shaft 13. The selector device 3 comprises a drive gear 21 integral with input shaft 13, reverse driven gear 22 rotatably mounted on the main shaft 20, and a synchronizer 27 mounted on the main shaft 20. The drive gear 21 meshes with one of counter gears 24 rotatably mounted on a shaft 23. Another gear of the counter gears 24 engages with an idler gear 26 rotatably mounted on a shaft 25, which in turn engages with the driven gear 22.

The synchronizer 27 comprises a hub 28 secured to the main shaft 20, a synchronizer sleeve 29 slidably engaged with the hub 28 with splines, and synchronizer rings 30 and 31. The synchronizer sleeve 29 is adapted to engage with splines of the drive gear 21 or with splines of driven gear 22 through rings 30 or 31.

At a neutral position (N range) of a selector lever (not shown), the sleeve 29 does not engage either gear, so that the main shaft 20 is disconnected from the input shaft 13. When the sleeve 29 is engaged with the gear 21, the input shaft 13 is connected to the main shaft 20 through the gear 21 and synchronizer 27 to provide a drive range position (D range).

When the sleeve 29 is engaged with the gear 22, the input shaft 13 is connected to the main shaft 20 through gears 21, 24, 26 and 22 to provide a reverse drive range position (R range).

The main shaft 20 has an axial passage in which an oil pump driving shaft 42 connected to crankshaft 10 is mounted. An output shaft 35 is provided in parallel with the main shaft 20. A drive pulley 36 and a driven pulley 37 are mounted on shafts 20 and 35, respectively. A fixed conical disc 36a of the drive pulley 36 is integral with main shaft 20 and an axially movable conical disc 36b is axially slidably mounted on the main shaft 20. The movable conical disc 36b has a piston portion 36c which slides in a cylinder 38a secured to the main shaft 20 to form a servo device 38. A chamber 38b of the servo device 38 communicates with an oil pump 41 through the pressure oil control circuit. The oil pump 41 is driven by the shaft 42.

A fixed conical disc 37a of the driven pulley 37 is formed on the output shaft 35 corresponding to the movable disc 36b and a movable conical disc 37b is slidably mounted on the shaft 35 corresponding to the disc 36a. Movable conical disc 37b has a cylindrical portion 37c in which a piston portion 39a of the output shaft 35 is slidably engaged to form a servo device 39. A chamber 39b of the servo device 39 is communicated with the oil pump 41 through the pressure oil control circuit. A spring 40 is provided to urge the movable conical disc 37b to the fixed conical disc 37a. A drive belt 34 engages with the drive pulley 36 and the driven pulley 37.

Secured to the output shaft 35 is a drive gear 43 which engages with an intermediate reduction gear 44a on an intermediate shaft 44. An intermediate gear 45 on the shaft 44 engages with a final gear 46. Rotation of the final gear 46 is transmitted to axles 48 and 49 of the vehicle driving wheels through a differential 47.

The hydraulic control circuit is responsive to vehicle speed, engine speed and throttle valve position for controlling the oil from the oil pump 41 to servo devices 38 and 39 thereby to move discs 36b and 37b. Thus, transmission ratio is continuously changed.

Figure 2A:
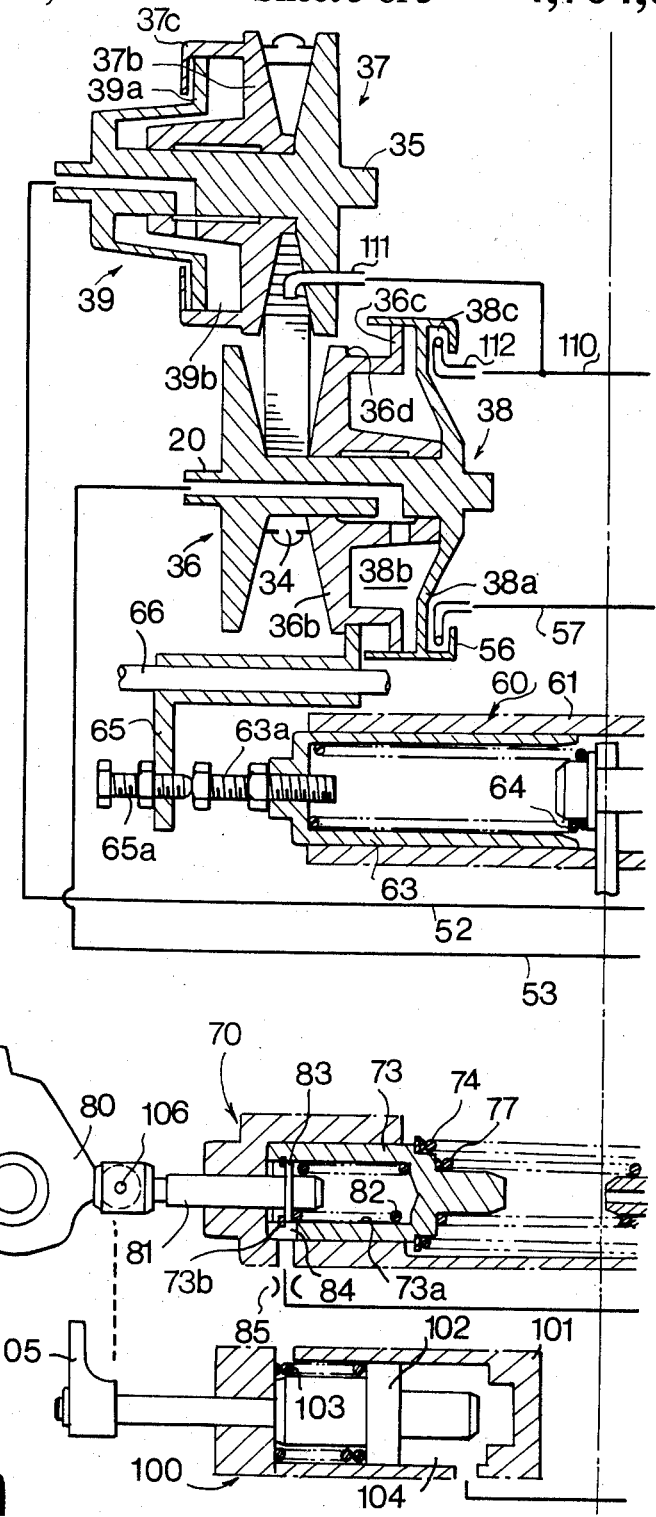
FIGS. 2a and 2b are hydraulic control circuits according to the present invention.
Figure 2B:
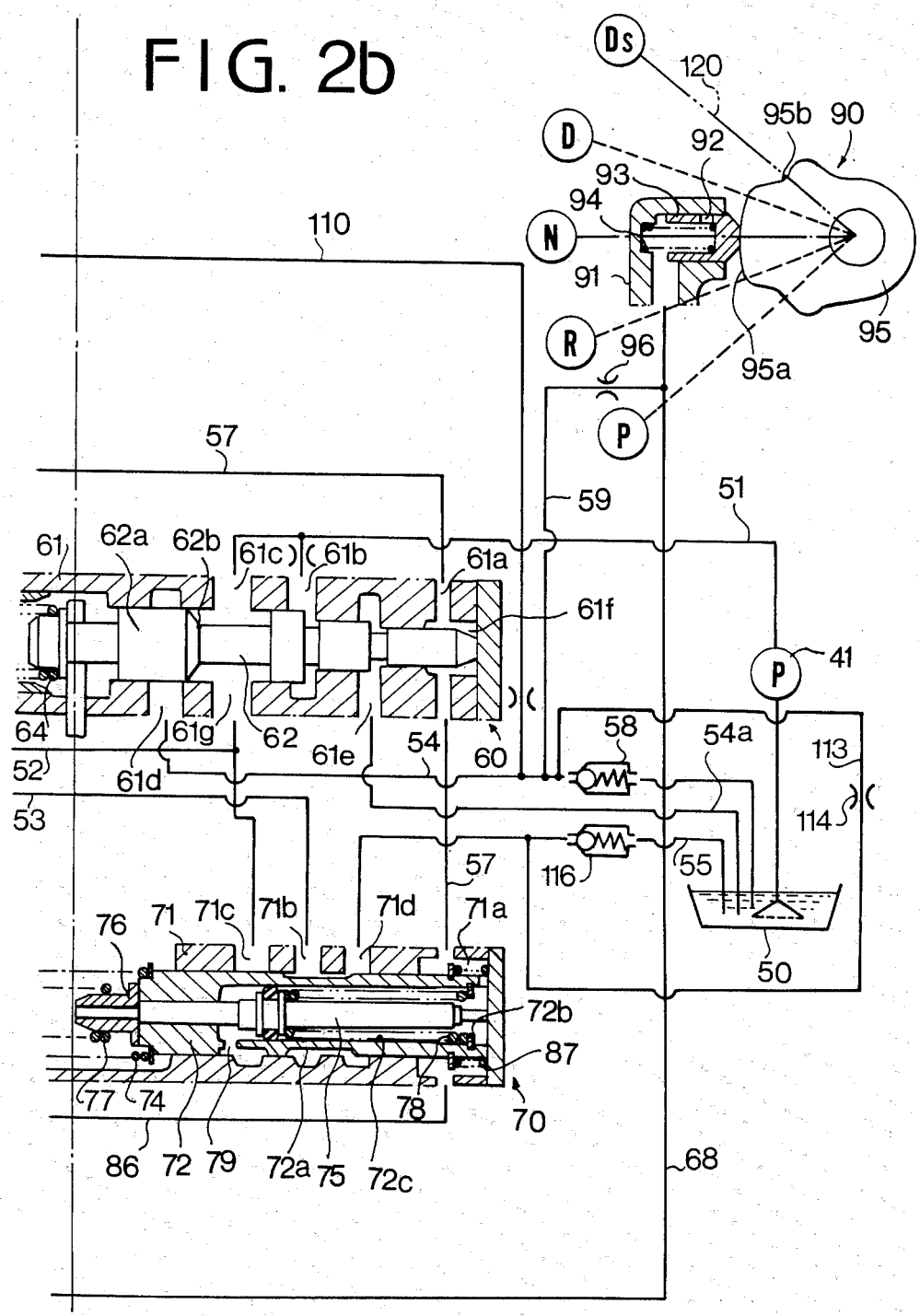

FIGS. 2a and 2b show the hydraulic control circuit according to the present invention. The movable disc 36b has an area exposed to the line pressure which is larger than the corresponding area of the movable disc 37b.

Oil in an oil reservoir 50 is supplied to a pressure regulator valve 60 through a passage 51 by the pump 41. An oil passage 52 from the pressure regulator valve 60 is communicated with the driven pulley servo chamber 39b and also with the drive pulley servo chamber 38b through a transmission ratio control valve 70 and a passage 53. The drive pulley cylinder 38a has an annular inside groove 38c in which a rotation speed sensor 56 in the form of a pitot tube is provided for measuring the speed of the oil in the groove that is the speed of the main shaft 20 which varies dependent on the engine speed. The pitot pressure produced by the rotation speed sensor 56 as a pitot tube is applied to the valves 60 and 70 through a passage 57, as described hereinafter.

The pressure regulator valve 60 comprises a valve body 61, a spool 62, a spring 64 provided between a spring retainer 63 and one end of the spool 62 for urging the spool 62 to the right. A sensor shoe 65 for detecting the actual transmission ratio is slidably mounted on a lubricating oil pipe 66 which is parallel with the axis of the spool 62. A bolt 65a secured to an end of the sensor shoe 65 engages with an end of a bolt 63a secured to the spring retainer 63, and the other end of the sensor shoe 65 engages with an outside periphery 36d of the movable disc 36b. Thus, the position of the movable disc 36b which means the transmission ratio during the operation is transmitted to the spool 62 through the spring 64. At the end of the valve body 61, opposite to the spring 64, pitot pressure is applied to an end chamber 61f through the oil passage 57 and a port 61a. On the other hand, pump oil pressure is applied to a port 61b of the valve body 61 through the passage 51. The passage 51 is communicated with the passage 52 through ports 61c and 61g. A port 61d and a port 61e, which is provided between the chamber 61f and port 61b for preventing the leakage of the oil from affecting on the pitot pressure, are communicated with the oil reservoir 50 through drain passages 54 and 54a. The port 61d is communicated with the port 61g through a chamber formed on a land 62a of the spool 62 so that the line pressure can be regulated.

A ball check valve 58 is provided in the drain passage 54 so as to produce a supplementary low pressure. Further, the passage 54 is communicated with a select position detecting valve 90 at the upstream of the check valve 58 through a passage 59 and further with an actuator 100 for the transmission ratio control valve 70 through a passage 68.

The spool 62 is applied with the pitot pressure and pump oil pressure so as to be moved in the direction to open the port 61d, whereas the elastic force of the spring corresponding to the transmission ratio detected by the sensor shoe 65 urges the spool 62 in the direction to close the port 61d. Accordingly, high line pressure generates at the port 61c at a low engine speed with a large transmission ratio. The sensor shoe 65 is moved to the left in FIG. 2a as the transmission ratio decreases, reducing the force of the spring 64 to lower the line pressure. The line pressure exerts on the belt 34 at a proper force dependent on the transmission ratio so as not to cause the belt to slip on the pulleys.

The transmission ratio control valve 70 comprises a valve body 71, a spool 72, an operating plunger 73, and a spring 74 provided between the spool 72 and the plunger 73. An end chamber 71a is communicated with the passage 57 to be applied with the pitot pressure. The control valve 70 further comprises a port 71b communicated with passage 53, a port 71c communicated with port 61g of the pressure regulator valve 60, a port 71d communicated with the oil reservoir 50 through a drain passage 55 having a check valve 116, an annular groove 72a formed on the spool 72 so as to communicate the ports 71b and 71c or 71b and 71d for supplying or discharging line pressure to or from the drive pulley servo chamber 38b in dependence on the position of the spool 72. A regulator spring 77 is provided between the operating plunger 73 and a retainer 76 securely mounted on a projecting end of a regulator plunger 75 which is slidably provided in an axial cavity 72c in the spool 72. A spring 78 is provided between a flange of the plunger 75 and a retainer 72b of the spool 72. The force of the regulator spring 77 is decided by the projecting extent of the plunger 75 from the spool 72 and the position of the plunger 75 is dependent on the line pressure at the port 71c which is supplied to the inside of the spool 72 through a small aperture 79.

The plunger 73 is slidably mounted in the valve body 71 and has an axial cavity 73a. A rod 81 is axially slidably mounted in the valve body 71, and a flange 83 of the rod 81 is slidably engaged with the wall of the cavity 73a. A small spring 82 is provided between the flange 83 and the plunger 73, and the flange 83 engages with a stopper 73b secured to the plunger. The cavity 73a is applied with the pitot pressure through a port 84 and a passage 86 having an orifice 85 and communicated with the chamber 71a. A spring 87 is provided between an end of the spool 72 and the valve body 71 to adjust the load on the spring 82. An end of the rod 81 engages with a cam 80 which is operatively connected to an accelerator pedal of the vehicle so as to be rotated in dependence on the depression of the pedal.

When the spool 72 is moved by the pitot pressure to communicate the port 71b with port 71c, the line pressure is applied to the servo chamber 38b of the drive pulley 36 to upshift the transmission. On the other hand, when the port 71b communicates with the port 71d, the chamber 38b is drained to downshift.

The select position detecting valve 90 comprises a valve body 91, a valve 93 having a drain aperture 92 and slidably mounted in the valve body 91, a spring 94 for urging the valve 93 to a cam 95 which is operatively connected to a selector lever 120 so as to rotate according to the position of the selector lever 120. The cam 95 has a lobe 95a which is corresponding to D, N, R range positions, and indentations 95b formed on the both sides of the lobe 95a, corresponding to P, Ds range positions. At the D, N, R range positions, the lobe 95 pushes the valve 93 in the direction to close the drain aperture 92, so that actuating oil pressure is built up. At the P, Ds range positions, the valve 93 moves outwards to open the drain aperture 92, so that the lubricating oil pressure in the passages 54, 59 is lowered. At that time the oil pressure decreases gradually, because of an orifice 96 provided in the oil passage 59.

The actuator 100 comprises a cylinder 101, a piston 102 which is slidably mounted in the cylinder 101, and a spring 103 for urging the piston 102 to a piston chamber 104 to which actuating oil pressure is applied through the passage 68. Further, a hook portion 105 formed at the outer end of the piston is engageable with a pin 106 on the rod 81 of the transmission ratio control valve 70. At the P range or Ds range, since no actuating oil pressure exists, piston 102 (hook portion 105) presses the rod 81 to the right in FIG. 2a, controlling the transmission zone to the side of high engine revolution. Thus, the releasing of the acceleration pedal at Ds range causes the downshift of the transmission, so that the engine braking effects. A lubricating oil supply nozzle 111 is provided adjacent the belt 34 and another lubricating oil supply nozzle 112 is provided in the groove 38c. Both nozzles are communicated with the drain passage 54 by a lubricating oil passage 110, so that the lubricating oil is supplied to the belt 34 and the groove 38c.

In accordance with the present invention, a supplementary low pressure oil passage 113 having an orifice 114 is connected between the drain passages 54 and 55 at upstream of check valves 58 and 116 so as to supply the oil having a supplementary low pressure from the passage 54 to passage 55.

The check valve 116 is provided to prevent the discharge of the supplementary low pressure oil to the oil reservoir 50. Thus, the supplementary low pressure oil is supplied to the servo chamber 38b passing through passage 113, orifice 114, passages 55, ports 71d, 71b and passage 53.

In operation of the system, while the vehicle is at a stop, the driven pulley servo chamber 39b is supplied with the line pressure adjusted by the pressure regulator valve 60 through the passages 51, 52, and the drive pulley servo chamber 38b is drained, since the spool 72 is at the right end position by the spring 74. Thus, in the pulley and belt device 4 of the infinitely variable belt-drive transmission 2, the driving belt 34 engages with the driven pulley 37 at a maximum running diameter to provide the largest transmission ratio (low speed stage).

On the other hand, the selector lever 120 is at the N range position to select the N range, so that the drain aperture 92 of the select position detecting valve 90 is closed. Accordingly, the pressure of the lubricating oil in the passage 110 is kept at a predetermined pressure to supply the lubricating oil to the belt 34 and groove 38c. As described above, the supplementary oil is supplied to the chamber 38b through passages 113, 55 and 53 to fill the chamber with the oil. The oil in the passage 53 is regulated by the check valve 116 in the drain passage 55, so that the supplementary oil pressure of the oil in the servo chamber is kept at a constant low value. Thus, the entering of air into the servo chamber 38b can be prevented.

When the D range is selected, the input shaft 35 and the main shaft 20 are connected to each other in the selector device 3 by the selector lever 120. When the acceleration pedal is depressed, the electromagnetic powder clutch 1 is excited by a clutch current, transmitting the engine power to the drive pulley 36. The power of the engine is transmitted to the output shaft 35 at the largest transmission ratio by the driving belt 34 and driven pulley 37, and further transmitted to axles of the driving wheels through the final reduction device 5. Thus, the vehicle is started.

When the pitot pressure rises, the spool 72 is shifted to the left to communicate port 71b with port 71c, so that the line pressure is applied to the servo chamber 38b to move the disc 36b to the left. Thus, the upshift of the transmission starts. On the other hand, port 71d is closed, so that the line pressure oil is prevented from flowing into passages 55 and 113 in the counter direction. At that time, since the servo chamber 38b is preliminarily filled with the oil, the disc 36b is immediately shifted to upshift the transmission.

Figure 3:
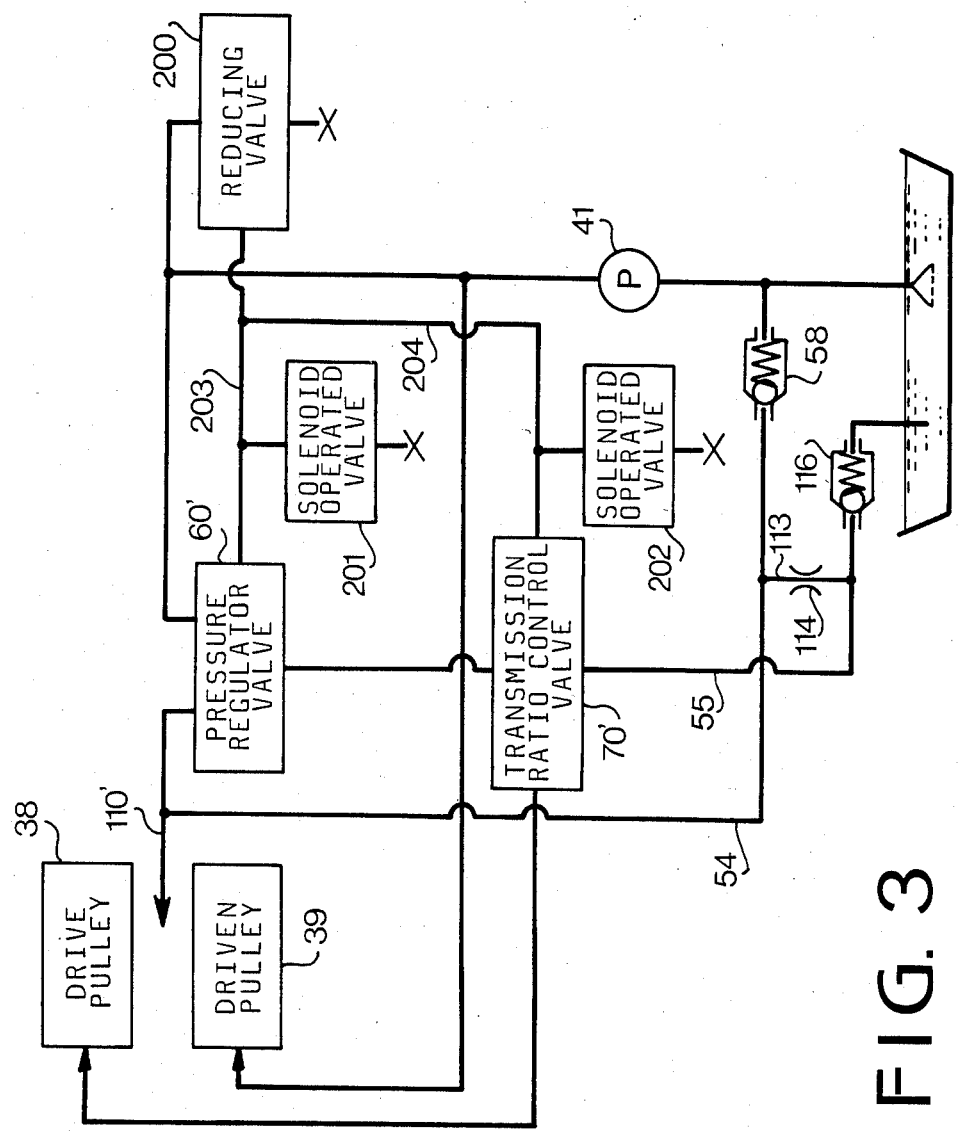
FIG. 3 is a block diagram showing another embodiment of the present invention.

Referring to FIG. 3 showing another embodiment of the invention, the system is provided with a reducing valve 200 for producing control oil having a constant pressure. The control oil is applied to ends of a pressure regulator valve 60' and a transmission ratio control valve 70' through passages 203, 204, respectively. The control pressure is controlled by solenoid operated valves 201 and 202 by controlling duty ratios of pulses applied to solenoids of the valves in accordance with operating conditions of the engine, so that spools of both valves 60' and 70' are shifted to change the transmission ratio.

In the system, check valves 58 and 116 are provided in drain passages 54 and 55, and supplementary oil passage 113 having orifice 114 is connected between the passages 54, 55, in the same manner as the first embodiment. The system has the same operation as the system of the first embodiment.

While the presently referred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a control system for a continuously variable belt-drive transmission having a selector device including a drive range position, a drive pulley having a hydraulically shiftable disc and a servo chamber for shifting the disc, a driven pulley having a hydraulically shiftable disc and a servo chamber for shifting the disc, and a belt engaged with both the pulleys, a hydraulic control circuit for supplying oil to the servo chambers and for draining the servo chambers, the hydraulic control circuit being provided with a pressure regulator valve for providing a line pressure and a transmission ratio control valve for applying the line pressure to the servo chamber of the drive pulley, the improvement comprising:

a first drain passage from the pressure regulator valve;

a second drain passage from the transmission ratio control valve;

a first check valve provided in the first drain passage and a second check valve provided in the second drain passage for building up supplementary low pressure in both drain passages at upstream of both the check valves;

a supplementary oil passage communicating both the first and second drain passages at upstream of the check valves for supplying a part of drain oil to the servo chamber of the drive pulley.

2. The control system according to claim 1 wherein the supplementary oil passage has an orifice.

3. The control system according to claim 1 further comprising a select position detecting valve for enabling the supply of the drain oil to the servo chamber at the selection of the drive range position of the transmission.

* * * * *